(12) United States Patent
Essex

(10) Patent No.: US 7,936,097 B2
(45) Date of Patent: May 3, 2011

(54) ELECTROMAGNETIC PROPULSION SYSTEM

(76) Inventor: James O Essex, Diamond Bar, CA (US)

( * ) Notice: Subject to any disclaimer, the term of this patent is extended or adjusted under 35 U.S.C. 154(b) by 0 days.

(21) Appl. No.: 12/813,322

(22) Filed: Jun. 10, 2010

(65) Prior Publication Data

US 2010/0244590 A1    Sep. 30, 2010

Related U.S. Application Data

(63) Continuation-in-part of application No. 11/801,205, filed on May 10, 2007, now abandoned.

(60) Provisional application No. 60/833,654, filed on Jul. 28, 2006.

(51) Int. Cl.
    *H02K 33/00* (2006.01)
(52) U.S. Cl. ........... 310/15; 310/24; 310/90.5; 318/124; 180/7.1; 74/84 R
(58) Field of Classification Search ............ 310/15, 310/20, 22, 24, 36, 23, 26, 90.5; 74/84 R; 180/7.1; 318/686, 119–134; 244/63
    See application file for complete search history.

(56) References Cited

U.S. PATENT DOCUMENTS

| | | | | |
|---|---|---|---|---|
| 1,198,934 A * | 9/1916 | Le Grande | ............ | 310/22 |
| 3,238,397 A * | 3/1966 | Maness | ............ | 310/27 |
| 3,266,233 A | 8/1966 | Farrell | | |
| 3,530,617 A | 9/1970 | Halvorson et al. | | |
| 3,670,223 A * | 6/1972 | Pommeret | ............ | 318/124 |
| 3,889,543 A | 6/1975 | Mast | | |
| 3,916,704 A | 11/1975 | Gaberson | | |
| 3,957,162 A * | 5/1976 | Soderqvist | ............ | 414/787 |
| 4,228,373 A * | 10/1980 | Funderburg | ............ | 310/20 |
| 4,242,918 A | 1/1981 | Srogi | | |
| 4,674,583 A * | 6/1987 | Peppiatt et al. | ............ | 180/7.1 |
| 4,801,111 A | 1/1989 | Rogers et al. | | |
| 5,685,196 A * | 11/1997 | Foster, Sr. | ............ | 74/84 R |
| 5,782,134 A * | 7/1998 | Booden | ............ | 74/84 R |
| 6,369,469 B1 | 4/2002 | Murray | | |
| 7,008,276 B1 | 3/2006 | Laul | | |
| 2008/0024013 A1 * | 1/2008 | Essex | ............ | 310/12 |
| 2010/0244590 A1 * | 9/2010 | Essex | ............ | 310/20 |

* cited by examiner

*Primary Examiner* — Karl I Tamai
(74) *Attorney, Agent, or Firm* — Kirk A. Buhler

(57) ABSTRACT

An electromechanical propulsion system is disclosed. The propulsion system uses magnetic propulsion and magnetic bearings to move a vehicle. The propulsion system is well suited for use on land, air, space, above water and underwater vehicles. The propulsion system includes a plurality of electromagnets that repel each other with strong and weak magnets to move the propulsion motor in linear motion. Multiple side propulsion motors can be incorporated to alter the direction of travel of the electromechanical propulsion system. The propulsion system is manufacturable in a self contained configuration where it is controllable from a remote location.

20 Claims, 3 Drawing Sheets

ELECTROMAGNETIC PROPULSION SYSTEM

CROSS REFERENCE TO RELATED APPLICATION

This application is a continuation-in-part of applicant's co-pending application Ser. No. 11/801,205 filed May 10, 2007 and claims priority to provisional application Ser. No. 60/833,654 filed Jul. 28, 2006 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in linear propulsion. More particularly, the present propulsion system includes a plurality of strong and weak electromagnets that repel each other to move the craft or load. A quantum leap in propulsion where pulsing parts are used to move a vehicle.

2. Description of Related Art Including Information Disclosed under 37 CFR 1.97 and 1.98:

The need for a better propulsion motor will be a benefit to most areas of our lives. Typical rotational motors require the conversion of rotational energy into linear motion using gears or a transmission. Linear motors do not require a transmission to change energy into linear motion. Typically these motors are called inertial or vibratory motors. A number of different linear electromechanical propulsion systems have been patented and exemplary examples of these patents are described herein.

U.S. Pat. No. 3,266,233 patented on Aug. 16, 1966 by A. W. Farrall discloses an Inertial Propulsion Device where the device consists of a rotational motor that turns a transmission to move an inertial mass in an oscillation motion. The reaction of the oscillation moves the device along the surface of the ground. While this system discloses a linear motion device the linear motion is caused by a rotational motor.

U.S. Pat. No. 3,889,543 patented on Jun. 17, 1975 by Oscar Mast discloses a propulsion system that uses the interaction of two magnets to alternately create linear motion. These magnets are arranged in a parallel orientation and operate independent from each other to provide the motion. In the pending application the electromagnets are arranged in a linear orientation where the electromagnets can work in harmony to provide a more linear motion in a single motor package.

U.S. Pat. No. 4,801,111 patented on Jan. 31, 1989 by Charles E. Rogers et al. discloses a System for Propulsion and Positioning of a Transitory Object. In this patent a coil generates a magnetic field to move a piston. The magnetic field is then collapsed and the piston is pulled with a spring into a metal plate. The impact of the piston on the medial plate causes motion of the vehicle. While this patent discloses imparting motion on a vehicle, the motion requires an impact and this for does not make the motion linear in nature.

U.S. Pat. No. 6,369,469 patented on Apr. 9, 2002 by Lawrence D. Murry discloses a Poly Phase Linear Alternator. The mechanism requires a motor with a number of electromagnetic coils that move to impart motion on a vehicle they are attached to. This patent requires motors to adjust the gap between the electromagnetic plates. While this invention uses electromagnetic force for the propulsion the amount of force is determined by moving the magnetic plated with a motor.

What is needed is a linearly arranged electromagnetic coils where the amount of power on each coil is controllable to vary the amount of propulsion. This allows the entire motor to move the vehicle with variable amounts of force and speed without using a rotational motor. The motion is further accomplished without requiring an impact to impart the motion to the vehicle. The proposed electromagnetic propulsion system provides this solution with an elongated linear drive system with variable output capability.

BRIEF SUMMARY OF THE INVENTION

It is an object of the electromagnetic propulsion system to provide a propulsion system that is comprises a single transportable motion source. This provides the advantage of using the system in a various vehicles. The system is controllable from the exterior of the drive system to provide remote control capability. The only connection to the drive motor is the power connection.

It is an object of the electromagnetic propulsion system to provide a propulsion system in an elongated configuration to allow the system to operate in an optimum linear configuration. The linear configuration allows multiple propulsion systems to be placed side by side to increase the propulsion force. The systems can also be placed in a linear relationship where one system is placed behind another to form an elongated group of electromagnetic propulsion motors that allows them to evenly distribute the weight of the devices within a vehicle.

It is another object of the electromagnetic propulsion system to provide a propulsion system with variable power drive control to allow the electromagnetic motors to output different amounts of force depending upon the propulsion needs. In a starting condition, maximum force may be needed to begin motion. Once the vehicle is in motion the power to the device can be reduced to maintain a constant speed.

It is another object of the electromagnetic propulsion system to provide a propulsion system that works with two or more pairs of electromagnets/superconducting magnets working together in a specific, predetermined order. One electromagnet repelling another one with a force greater than the other. The maximum gauss/magnetic field intensity is the desired goal. Each electromagnet is energized either, simultaneously or in sequence or in succession. Each magnet's field intensity/gauss is controlled to control the forces (power-to-weight ratio) needed to overcome the load, craft, vehicle or any object to be moved. The electromagnets work together to repel simultaneously or sequentially. One magnetic field force is always greater than the other.

It is still another object of the electromagnetic propulsion system to provide a propulsion system with variable rate control to control the frequency that the coils are being energized. The variable rate along with the variable power allows the system to provide small power pulses to provide smoother motion.

The electromagnetic propulsion technology system consists of two or more pairs of electromagnets or superconducting magnets. These pairs of electromagnets work together in a specific, predetermined order and relation of like-poles opposing one another using a strong and a weak pole. Each pole is electrically energized. The power to each electromagnet is governed by a device such as a rheostat/potentiometer or other power limiting device. A on or off pulse signal is transmitted remotely to a receiver which is responsible for activating a power source, controlled/governed by a rheostat or other. When the electromagnet is energized, each electromagnet will be energized simultaneously or in sequence with the on or off pulse-signal transmission.

The signal on or off pulse is transmitted by a remote controlled transmitter to a harmonious receiver. This is joined with a power control device. The receiver is also joined to the battery or power supply. When the receiver is activated each electromagnet is energized to a desired magnitude, intensity of magnetic field strength.

The magnets not only function as the repulsive force, but they are also used to accelerate a load via the on or off pulse signal's rate of transmission which is received by all magnets simultaneously or in sequence via the receiver.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
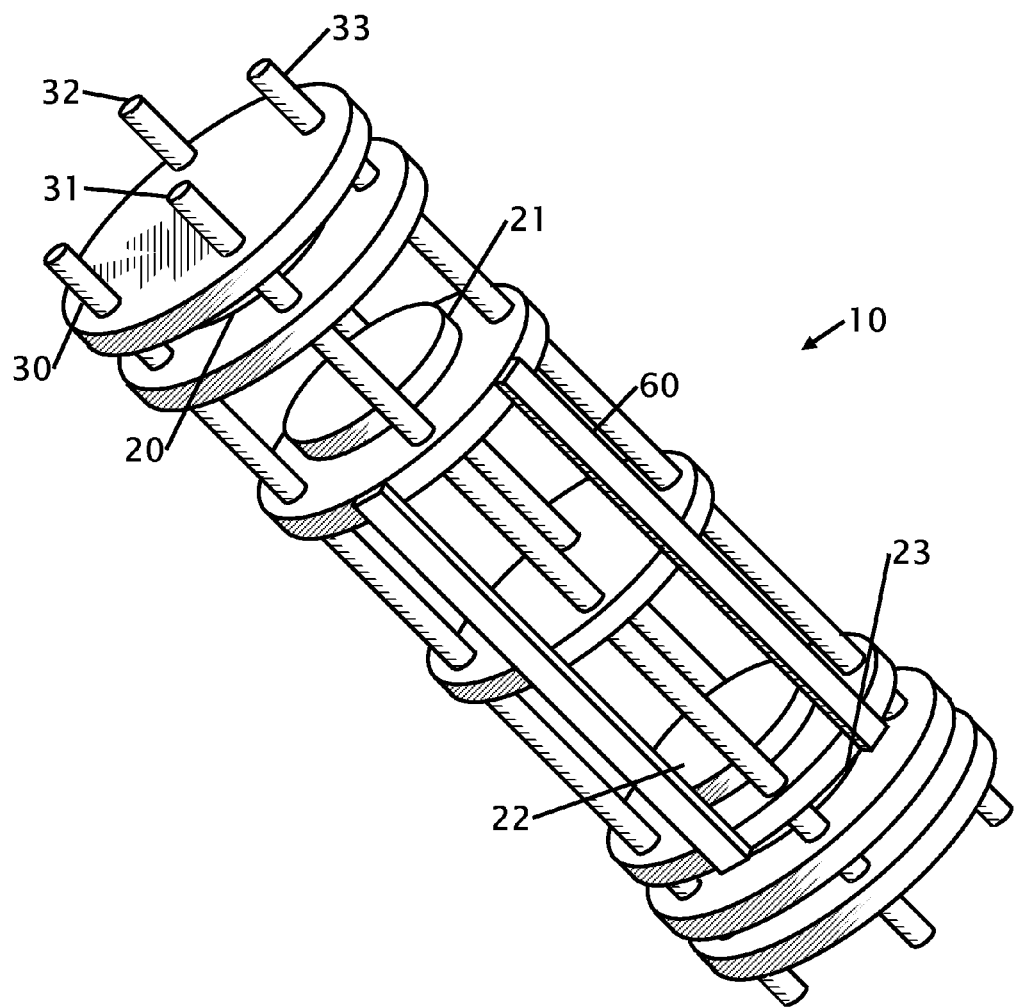
FIG. 1 shows an isometric view of the electromagnetic propulsion system with the power source and the receiver/controls removed.

FIG. 1 shows an isometric view of the electromagnetic propulsion system with the power source and the receiver/controls removed. The electromagnetic propulsion system operates with pulse signals of on and off transmission where the "pulsating dc" creates motion. The electromagnets are arranged in a specific order and relation to one another, in a predetermined order and given a chosen strength/magnitude of repulsion that creates the engine which produces magnetic propulsion power for linear motion.

The on and off pulse signal transmission has a break between each transmission. With adjustable rates of speeds from 0 to the limits of technology. There can be from one pulse transmitted per second, up to what ever technology permits. The transmission of the on and off pulses is produced by a radio remote control signal, activating a receiver. This activates an electric current, and is only limited by engineering considerations and technology.

Referring to FIG. 1, electromagnets 21 and 23, are the strong magnetic repulsion forces, they are the repelling forces. They are limited only by engineering considerations and technology. Electromagnets 20 and 22, are the weak magnetic forces, they are repelled by electromagnets 21 and 23, respectively. Electromagnets 20 and 22 maintain a magnitude/strength equal to that of the load/craft but, they also have the capacity by means of a current control device to match electromagnets 21 and 23 strength. Electromagnets 21 and 22 are attached to the load/craft, and remain permanent and stationary. Electromagnets 20 and 23 are attached to one another by means of guide rods 30-33 with electromagnet 20 at one end of the rods and electromagnet 23 at the other end. Each rod passes through ball bearing or "magnetic bearing" 40-45 (FIG. 2) which keeps them suspended or free floating. In this arrangement electromagnets 20 and 23, all guide rods are free floating/independent by means of the bearings. This free floating arrangement is an essential element for the electromagnetic propulsion technology system to work. The interactions between electromagnets 20-23 causes movement of the load/craft. The magnets of this system 23 and 20 are free-floating, where each is independently adjustable. They can also be physically adjusted independently back and forth along the guide rods in relation to electromagnets 22 and 21 respectively, specifically 23 to 22 and 20 to 21. Magnets 22 and 21 are both fixed and stationary where they are attached to the load or craft. Magnets 23 and 20 can be moved in a back and forth direction along guide rods so as to maximize the most efficient magnetic field force.

Electromagnets 22 and 21 are energized to a desired strength/magnitude. Magnet 22 a strength equal to the weight of the load, via the rheostat/potentiometer or some other, more sophisticated control system. Electromagnet 21 has strength greater than the load/craft. Electromagnets 23 and 21 are the driving forces their strengths are generally equal at all times but can be regulated otherwise for experimental purposes. Electromagnet 23 pushes/repels along with electromagnet 21 which also pushes/repels; together they use a combined magnetic force/strength which is always greater than magnets 22 and 20 combined with the load/craft. The strengths of electromagnets 23 and 21 are adjustable, from 0 ... To the greatest magnitude technology permits. Magnets 22 and 20 is also adjustable, from 0 to maximum power that is available from the power source or as limited by the rheostats. Magnets 23, 21, and 22, 20 operate in harmony with the on and off pulse signal accelerated by a high-speed device computer-accelerated from 0 to the limits of technology to provide maximum speed or power.

Figure 2:
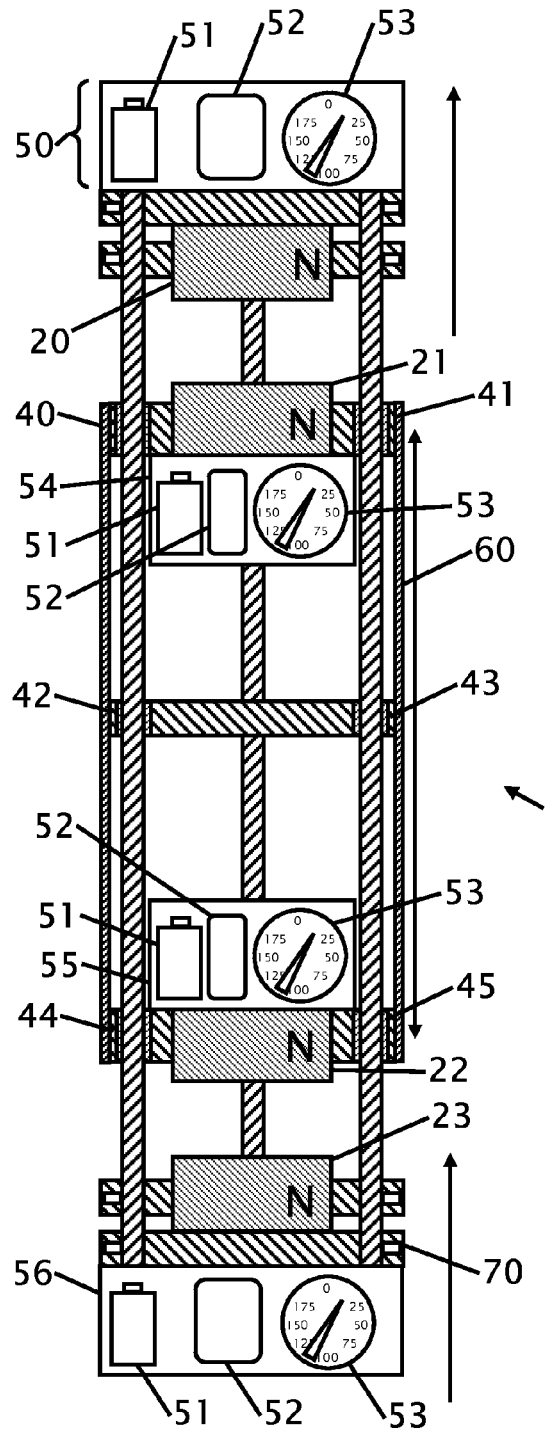
FIG. 2 shows a side view of the electromagnetic propulsion system

FIG. 2 shows a side view of the electromagnetic propulsion system. Each units coil has its own separate control unit(s) 50, 54, 55 and 56 that contains a power source 51, receiver 52 and rheostat or other similar power control device that limits the amount of power that is transmitted to the coil with each pulse. An external radio remote controlled transmitter unit transmits a stream of on and off signals that are received by receivers 52. The remote control device is operable from outside the vehicle/craft or from within the vehicle/craft. It is imperative to operate remotely, using a pulse on and off transmission transmitter, apart from the engine when activating the "pulsating "dc" "electromagnetic propulsion technology system". The ends of the rods 30-33 go through or terminate with the end plates where they are maintained in position with a fastener 70.

Figure 3:
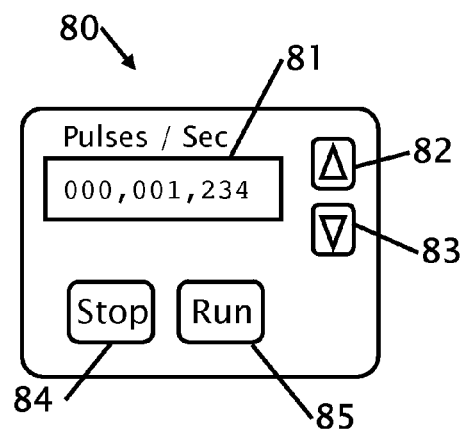
FIG. 3 shows an embodiment of the remote control unit.

FIG. 3 shows an embodiment of the remote control unit. The transmitter 80 is a high frequency radio type remote control device, which sends pulse-signal transmission on and off signal. These on and off signals provide high speed, computer accelerated, from 0 to the limits of technology with a visible readout 81 showing the rate of the pulses being sent in pulses per second. Up 82 and down 83 control buttons adjust the rate of the pulses being transmitted. The remote also has stop 84 and run 85 buttons to turn on and off the remote. While the transmitter and receiver is preferably a wireless radio type device, infrared or other light transmission remote is contemplated. In addition to simultaneous pulse signaling a more sophisticated computerized transmitter and receiver is also contemplated that will allow for sequentially and or succession signals of transmission that transmit a pulse to electromagnet 21 followed by a pulse to electromagnet 23. These pulse signals can then be followed in the reverse electromagnet energizing order to provide braking, stopping and reverse motion.

The receiver 52 must complement the transmitter and there must be harmony between them in regard to the pulse transmission and pulse reception so as to energize the electromagnets simultaneously or in sequence, a chosen, predetermined order. The receiver(s) 52 activates a power source 51, which is governed by a rheostat, potentiometer 53 or similar power control/limiter. More sophisticated electronic control device can be connected to the electromagnets/superconducting magnets to energize them in a desired way or to a desired magnetic field intensity/gauss, magnitude of the on and off pulses.

Simultaneous or sequential reception: (imperative) a must, each electromagnet(s)/superconducting magnet (s) must receive the electrical transmitted pulse/signal simultaneously or in sequence by way of the receiver to the (rheostat/potentiometer) or a more sophisticated electronic control device. The power and speed of this electromagnetic propulsion technology system is limited only by the limitations of engineering considerations and technology. Independent propulsion force of the free-floating electromagnet 23 strong magnetic repulsion force and electromagnet 20 weak magnetic repulsion are independent of the load/craft, they are free—floating, and they stand alone, but are joined together. In this system's configuration electromagnets 20 and 23 are united with fixed magnets 21 and 22. These components make up the whole engine, the driving force.

Electromagnet 23 is the strong magnetic force. The push/repelling force in relation to electromagnet 22, which is the weak force. The strength of electromagnet 22 is generally equals that of the load/craft. Electromagnet 21 is a strong magnetic with force that always exceed electromagnet 20 weak magnetic force, free floating. Electromagnet 21 is the strong magnetic force. Electromagnet 21 has a strength that will always exceed the weight of the load/craft. Electromagnet 20, which is the weak magnetic force, is repelled by the strong magnetic force of electromagnet 21.

Figure 4:
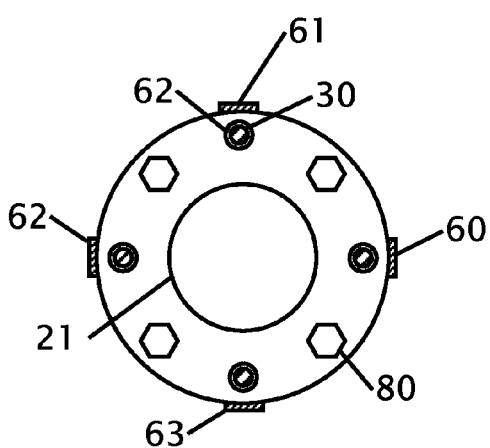
FIG. 4 shows a cross sectional view of the electromagnetic propulsion system.

FIG. 4 shows a cross sectional view of the electromagnetic propulsion system. The cross section shows an electromagnet 21, the guide rods 30-33 on magnetic bearings 40-45. Bolts or other similar fastening hardware holds the components of the power, receiver, control and the electromagnet together. Side stringers 60-63 keep the components mechanically connected together for securing to a vehicle. The magnets 21, 22 and the side stringers 60-63 are a connected unit. Magnets 20,23 are attached to the guide rods which pass through bearings 40-45 of the assembly of magnets 21,22 and the side stringers 60-63. Electromagnets 21 and 22 are fixedly attached to the craft or load while electromagnets 20 and 23 are slidably adjustable on the rods 30-33.

Figure 5:
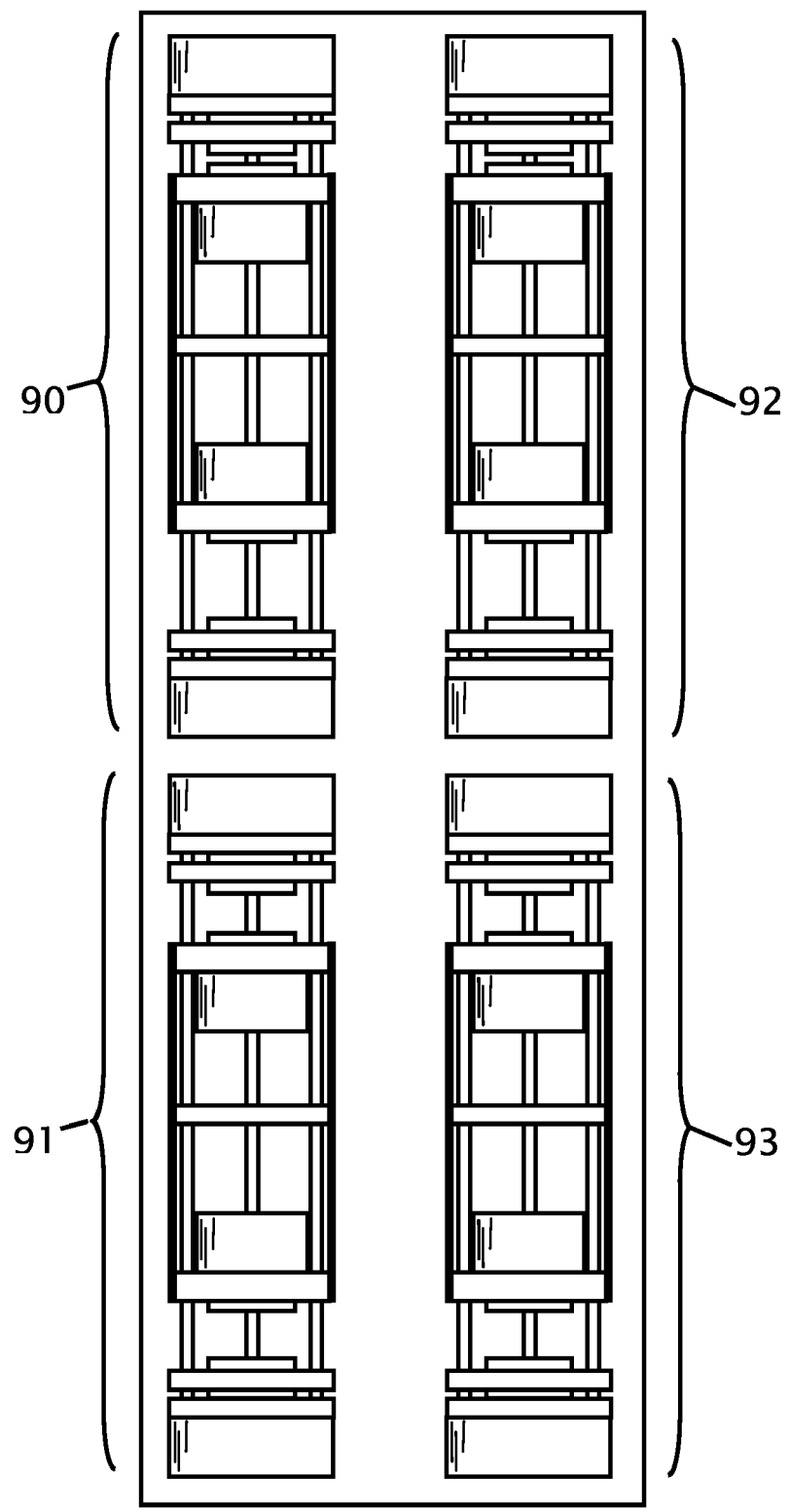
FIG. 5 shows an arrangement of four electromagnetic propulsion systems being controlled by a single transmitter.

FIG. 5 shows an arrangement of four electromagnetic propulsion systems 90-93 being controlled by a single transmitter. This arrangement of power systems allows the driving force to be increased. Two sets of power systems are shown side by side and one after another to show that the power systems can be configured in a variety or orientations based upon vehicle design.

Thus, specific embodiments of an electromagnetic propulsion system have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A electromagnetic propulsion system comprising:
   four separate electromagnets each having their own wireless receiver, power source and power controller;
   a first and a fourth of said four separate electromagnets connected to an inner frame structure such that they levitate together floating freely on free floating magnetic bearings;
   a second and a third of said four separate electromagnets connected to an outer frame whereby said second electromagnet repels said first electromagnet and said third electromagnet repels said fourth electromagnet
   said repelling forces thereby creates an imbalance between said magnetic fields that creates unidirectional stresses between said inner and outer frame structure that translates said inner frame on said outer frame.

2. The electromagnetic propulsion system according to claim 1 wherein one of the electromagnets connected to said inner frame structure is orientated to magnetically couple and repel with only one of the two electromagnets connected to the outer frame.

3. The electromagnetic propulsion system according to claim 1 wherein the wireless receiver in each said electromagnets operate in unison based upon a binary on or off signal.

4. The electromagnetic propulsion system according to claim 1 wherein the wireless receiver in each said electromagnets operate sequentially succession based upon a binary on or off signal.

5. The electromagnetic propulsion system according to claim 1 wherein one of said two electromagnets connected to the inner frame and one of said second electromagnet is stronger than said first electromagnet and said third electromagnet is stronger than said fourth electromagnet.

6. The electromagnetic propulsion system according to claim 1 wherein all four electromagnets are arranged in a linear relationship.

7. The electromagnetic propulsion system according to claim 1 wherein the power controller can vary the amount of power that is applied to the associated electromagnets.

8. The electromagnetic propulsion system according to claim 1 wherein the receiver is a wireless receiver that operates as a radio frequency or light receiver.

9. The electromagnetic propulsion system according to claim 1 wherein the power controller is adjustable.

10. The electromagnetic propulsion system according to claim 1 wherein the power controller is a potentiometer or a rheostat.

11. The electromagnetic propulsion system according to claim 1 wherein the magnetic bearing operate on at least three rods that connect the said two outer electromagnets.

12. The electromagnetic propulsion system according to claim 1 wherein the power source is rechargeable.

13. The electromagnetic propulsion system according to claim 1 wherein the repulsion of a strong and a weak electromagnet causes the entire electromagnetic propulsion system to move.

14. The electromagnetic propulsion system according to claim 1 wherein more than one electromagnetic propulsion system can be oriented in a parallel or serial orientation to increase the amount of propulsion.

15. The electromagnetic propulsion system according to claim 1 wherein the electromagnets are wound coils.

16. The electromagnetic propulsion system according to claim 1 wherein the power controller controls the voltage and or current amps to the electromagnet.

17. The electromagnetic propulsion system according to claim 1 wherein the power controller for each said four electromagnets is individually adjustable.

18. The electromagnetic propulsion system according to claim 1 wherein the transmitter and receiver receive binary on and off pulses.

19. The electromagnetic propulsion system according to claim 1 wherein at least two of the electromagnets has a magnetic repulsion force that is greater than the weight of the electromagnetic propulsion system and a vehicle the electromagnetic propulsion system is attached.

20. The electromagnetic propulsion system according to claim 1 wherein the magnitude of the magnetic force of said first and third electromagnets causes forward directional motion of said inner frame with said outer frame; and the weak magnetic force of said second and fourth electromagnet causes braking, slowing, stopping and reversing of the propulsion system only when the order of power is reversed;

wherein the magnetic force of said first and third electromagnets are the weaker magnetic force and the said second and fourth electromagnets are given strengths greater than a load.

* * * * *